July 5, 1966 P. X. M. ROCCHISANI 3,259,302

CLOSURE DEVICE

Filed April 12, 1963 2 Sheets-Sheet 1

INVENTOR
PIERRE XAVIER MARC ROCCHISANI

BY Fritz G. Hochwald
AGENT

CLOSURE DEVICE

Filed April 12, 1963 2 Sheets-Sheet 2

INVENTOR
PIERRE XAVIER MARC ROCCHISANI

BY Fritz G. Hochwald
AGENT

United States Patent Office 3,259,302
Patented July 5, 1966

3,259,302
CLOSURE DEVICE

Pierre Xavier Marc Rocchisani, 68 Rue de Verneuil, Paris, France

Filed Apr. 12, 1963, Ser. No. 272,591
5 Claims. (Cl. 229—62)

The object of the present invention is a device permitting, with less effort, the firm pressing of two surfaces one against the other, in order to hold them easily together, and, if desired, to use this pressure for compressing a body previously inserted between them.

The two surfaces pressed one against the other can form a sealed closure if they are the end, or the extension of the inner wall, of a container.

They can act to secure an inserted body, or to join two inserted members, or to close a flexible bag by closing the folded or gathered in the neighbourhood of the opening.

The arrangement essentially makes use of the difference of the tensions to which two members, superposed and secured together at two points, are subjected when one brings these two points towards one another by bending the assembly in a plane perpendicular to the plane of separation of the two members.

If made of a relatively flexible material, the bending effort necessary is small relative to the total pressure of the members which results.

The ends of the assembly, or their extension, being joined, the "aperture" cannot be opened and the outer member is maintained around the inner member.

To the contrary, before the bending of the assembly, the two members can be easily separated for the insertion between them of a body to be closed.

It can be seen thus that it is possible to secure and to hold secured, a thin and long member, in uniform fashion on all the surface of contact.

If one inserts, for example, the end of a bag which is flexible at the neighbourhood of the opening and if one compresses it by the effect of bending of the members, one obtains a flattening of the folds formed by the material of the bag at a great part of their length or in a number of points and of an elastic manner which eliminates the weak points to ensure the closure of the bag and, the conditions being reconciled, the sealing of this closure.

Moreover the closure device is such that the system of closure constitutes a true securing which resists opening up.

This is why the system can be utilized for securing and fastening a fabric, no matter what texture, clamped between the two members, or to effect linking or joining.

Its simple construction only requires flexible materials, to the exclusion in some cases of all metal parts, guaranteeing against all damage of fragile materials to which it may be applied, and giving it an economic and practical character.

Other features and advantages will appear in the course of the following description which, made with reference to the accompanying drawings and given by way of nonlimitative examples, makes clear how the present invention can be put into practice.

Figure 1:
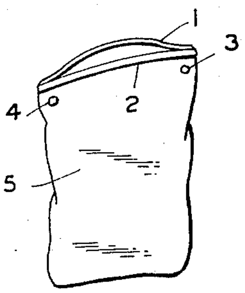
FIGURE 1 is a perspective view of a bag of which the mouth is provided with the device according to the invention.
Figure 2:
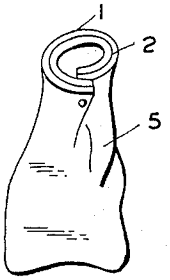
FIGURE 2 is a perspective view of the said sack when closed.

In the embodiment of FIGURES 1 and 2 there is seen the bag 5 of which the opening is formed by two lips 1 and 2 which can be of different thickness, the lip 1 which can be extended being thinner than the lip 2.

At the ends of these lips, female and male members, 3 and 4, of a press fastener are mounted through the double thickness of the said lips.

These lips are pressed one on the other by bending which has the effect of extending the lip 1 situated at the outside.

This tension results in pressure of the lip 1 on the lip 2.

The bending is continued until the male and female parts of the press fastener come face to face and can be pressed one into the other.

The bending is then maintained by the press fastener, and the lip 1 continues to exert pressure on the lip 2, not allowing any passage between them.

The bag 5 is thus closed as shown in FIGURE 2.

In the embodiment of FIGURES 3 to 7, there can be seen two equal strips 1 and 2 formed in one or more materials having the properties of flexibility and elasticity and of appropriate thicknesses. These strips are joined in the neighbourhood of their ends by the male and female parts 4 and 3 of a press fastener mounted through their double thickness.

Figure 3:
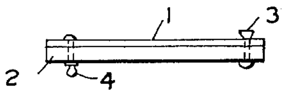
FIGURE 3 is a view in elevation of the closure device.
Figure 4:
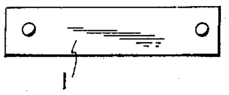
FIGURE 4 is a plan view corresponding to the elevation of FIGURE 3.
Figure 5:
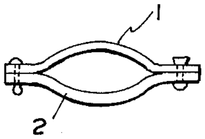
FIGURE 5 is a view in elevation of the same apparatus showing the two members separated.

FIGURE 5 shows the apparatus of which the embodiment has been described with respect to FIGURES 3 and 4, but of which the ends have been drawn towards one another, to show how the two members 1 and 2 can be separated by bending to permit the insertion between them of another body.

Figure 6:
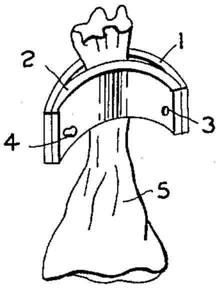
FIGURES 6 and 7 are perspective views of the preceding apparatus embracing the opening of a bag before and after closure.

FIGURE 6 shows a practical application, for clamping the walls of a bag in the neighbourhood of its opening, of the device whose construction has been described with respect to FIGURES 3, 4 and 5. It can be seen that the material of the bag 5 is gathered together and introduced between the members 1 and 2 which have been bent.

Figure 7:
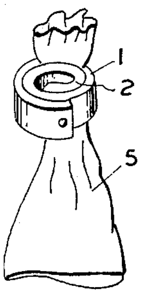

FIGURE 7 shows the apparatus and the bag of FIGURE 6 after effecting the bending and maintaining the latter by the use of the press fastener.

The flattening of the walls of the bag between the members 1 and 2, thanks to the pressure exerted by the member 1 on the member 2, assures the closure of the bag 5.

Figure 8:
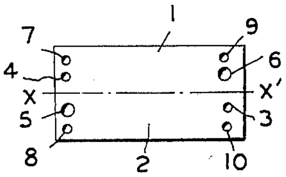
Figure 9:
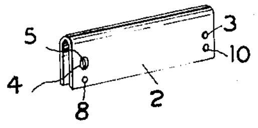

In the embodiment of FIGURE 8 the apparatus consists of a single sheet which is folded on itself, about a midline X—X, so that its two halves 1 and 2 lie one on the other as shown in FIGURE 9. This fold is maintained by means of two press fasteners of which the male parts 7 and 9 and female parts 8 and 10 come face to face due to the folding.

The two halves of the sheet, integral and superposed, serve the same function as the two members of the embodiment described with respect to FIGURE 3, with this difference that the inserted body cannot pass the fold which stops it.

The maintenance of the curvature after bending of the assembly is assured by the closure of a press fastener of which the male part 4 fixed on the member 1 passes freely through the hole 5 provided in the member 2 to engage the female part 3, of the member 2, through the hole 6 provided in the member 1.

Figure 10:
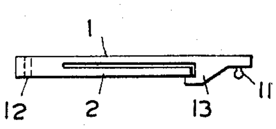
FIGURES 8 to 25 are different views of other variations.

In the embodiment of FIGURE 10, the entire device is cast as a single piece.

The element 1 comprises, at one of its ends, the housing 12 of the stud 11 provided at the other end. The member 2 is integral with the member 1 at one of its ends.

The second end is free and engages an abutment 13 provided on the member 1.

The maintenance of the curvature is effected by inserting the stud 11 into its housing 12.

Figure 11:
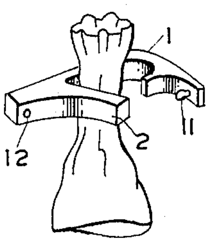

FIGURE 11 shows how the free end of the member 2, disengaged from the abutment 13, allows the easy introduction of the mouth of a bag which is to be compressed, without having to thread it between the members. The bending of the assembly can be effected after the free end has been replaced behind its abutment.

Figure 12:
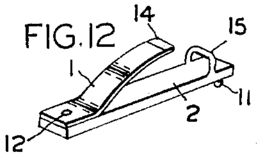

In the embodiment of FIGURE 12, which is a modification of the preceding embodiment, it is the member 1 which has a free end provided with a buckle 14 adapted to be inserted under the loop 15 of the member 2. The other end of the member 1 has been secured to the element 2 by riveting. A hole 12 through the two members provides the housing 12 for the stud 11 for maintaining the curvature after bending of the assembly.

Figure 13:
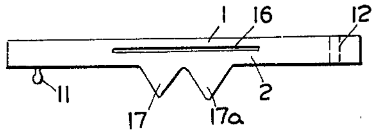
Figure 14:
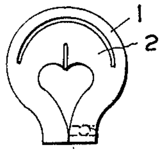

In the embodiment of FIGURE 13 the apparatus consists of a single member and comprises a slot 16 which divides it over a certain length into two members 1 and 2. The two bosses 17 and **17*a* provided on the member 2 have appropriate shape for splaying at the time of bending and prevent the collapse of the aperture. At the conclusion of bending, the curvature is maintained by insertion of the stud 11 in the housing 12** as shown in FIGURE 14.

Figure 15:
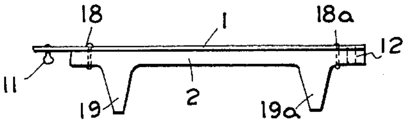

In the embodiment of FIGURE 15 one end of the member 1 overlaps the end corresponding to the member 2 and is provided with a stud 11 adapted to be inserted, after bending of the assembly, in the housing 12.

Figure 16:
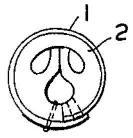

The two members are secured by rivets 18 and **18*a*. The member 2 is provided with two projections 19 and 19*a*** which come together at the end of bending to form the aperture, as shown in FIGURE 16.

Figure 17:
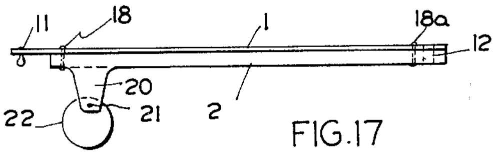
Figure 18:
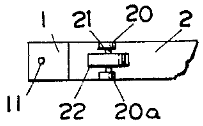
Figure 19:
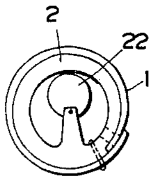

In the embodiment of FIGURES 17 and 18 which is a modification of the previous embodiment, two projections 20 and **20*a* support an axle 21 around which can pivot an eccentric roller 22. When the bending is finished and held by the insertion of the stud 11 into the housing 12, one can turn roller 22 around its axle 21** so as to bring its greatest radius in the axis of the projection, as shown in FIGURE 19.

Figure 21:
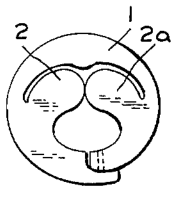
Figure 20:
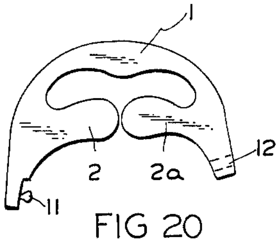

In the embodiment of FIGURE 20 the apparatus consists of a single member. The external member 1 has a predetermined profile, with inwardly projecting parts 2 and **2*a* which constitute the inner member. Maintenance of the curvature is by insertion of the stud 11 into the aperture 12** as shown in FIGURE 21.

Figures 22, 23, 24:
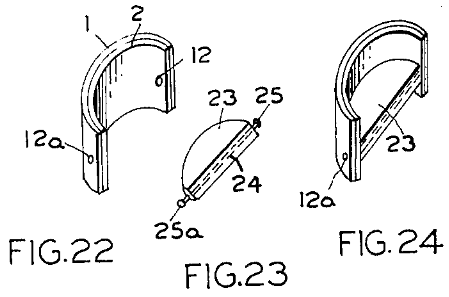

In the embodiment of FIGURES 22 and 23 the members 1 and 2 are secured together at their ends and are provided with two holes 12 and **12*a*. The other part is provided by a rigid former 23 through which an axle 24 extends provided at its ends with two heads 25 and 25*a***.

The assembly of the members 1 and 2 being then bent as shown in FIGURE 22, the heads 25 and **25*a* are engaged respectively in the holes 12 and 12*a* and pressed in until they pass completely through the double thickness of the members 1 and 2 and thus maintain the curvature of the assembly. The former 23 is then rotated about the axle 24** until it is in a plane perpendicular to the axis of curvature as shown in FIGURE 24. This former, of appropriate dimensions, avoids deformation of the assembly.

Figure 25:
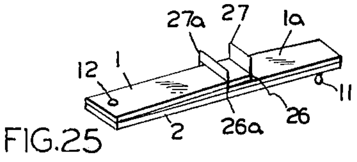

In the embodiment of FIGURE 25 the outer member consists of two half members 1 and **1*a* of which the free ends 26 and 26*a* overlap and of which the other ends are secured to the corresponding ends of the member 2. The assembly comprises a stud 11 and its housing 12 which maintain the curvature after bending. The ends 26 and 26*a* are provided respectively with support plates 27 and 27*a* perpendicular to their plane. The plate 27*a*, slotted at its base, permits the end 26 of the half-element 1** to extend through it.

When the assembly is bent the two plates move towards one another until they exert a pressure one upon the other or upon a body previously inserted between them.

It is apparent that one can without departing from the spirit of the present invention introduce many modifications in the embodiments which have been described.

What I claim is:

1. In a closure device for a bag comprising two preassembled superposed strips of elastic material for enclosing the mouth of the bag between themselves, one part of a fastening means secured to the one ends of said superposed strips, the other part of said fastening means being secured to the other ends of said strips, said strips being bent around the mouth of said bag into locking position of said fastening means whereby, in locked position, the one elastic strip folded around the bag and being surrounded by the other elastic strip is placed thereby under increased compression, the improvement comprising at least one of said strips being secured by means of an abutment provided by a re-entrant surface.

2. In a closure device for a bag comprising two preassembled superposed strips of elastic material for enclosing the mouth of the bag between themselves, one part of a fastening means secured to the one ends of said superposed strips, the other part of said fastening means being secured to the other ends of said strips, said strips being bent around the mouth of said bag into locking position of said fastening means whereby, in locked position, the one elastic strip folded around the bag and being surrounded by the other elastic strip is placed thereby under increased compression, the improvement comprising complementary interengaging recesses and projections on the contacting surfaces of said superposed strips.

3. In a closure device comprising two superposed members of elastic material joined at their ends only and defining between themselves an aperture for insertion of the mouth of an article to be closed, a fastening element at one end of said joined members, a mating fastening element at the other end of said joined members, which superposed members when folded upon each other and locked by engagement of said fastening elements form an inner compressed member and an outer compressing member firmly closing the mouth of said article, the improvement comprising bosses or rollers on said members which bosses or rollers serve to reinforce the inner shoulder of the aperture.

4. In a closure device comprising two superposed members of elastic material joined at their ends only and defining between themselves an aperture for insertion of the mouth of an article to be closed, a fastening element at one end of said joined members, a mating fastening element at the other end of said joined members, which superposed members when folded upon each other and locked by engagement of said fastening elements form an inner compressed member and an outer compressing member firmly closing the mouth of said article, the improvement comprising a rigid member associated with said inner member.

5. In a closure device comprising two superposed members of elastic material joined at their ends only and defining between themselves an aperture for insertion of the mouth of an article to be closed, a fastening element at one end of said joined members, a mating fastening element at the other end of said joined members, which superposed members when folded upon each other and locked by engagement of said fastening elements form an inner compressed member and an outer compressing member firmly closing the mouth of said article, the improvement wherein said inner member comprises two parts which, at the time of bending the assembly, are strongly supported against the concave face of the outer member.

(References on following page)

References Cited by the Examiner

UNITED STATES PATENTS

| | | | |
|---|---|---|---|
| 789,331 | 5/1905 | McClay | 24—30.5 |
| 1,136,259 | 4/1915 | Paridy | 24—30.5 |
| 1,237,564 | 8/1917 | Seydel | 224—7 |
| 1,310,494 | 7/1919 | Brooks | 24—30.5 |
| 2,320,308 | 5/1943 | Silverman | 16—87.2 |
| 2,503,435 | 4/1950 | Chester | 24—137 |
| 2,519,987 | 8/1950 | Wernette | 24—137 |
| 2,783,515 | 3/1957 | Tobias | 24—81 |
| 2,843,309 | 7/1958 | Wheeler | 229—62 |
| 2,885,758 | 5/1959 | Russo et al. | 24—138 |
| 2,988,314 | 6/1961 | Urich. | |
| 3,008,835 | 11/1961 | Madding. | |

JOSEPH R. LECLAIR, *Primary Examiner.*

FRANKLIN T. GARRETT, *Examiner.*

D. T. MOORHEAD, *Assistant Examiner.*